(12) United States Patent  (10) Patent No.: US 7,914,187 B2
Higgins-Luthman et al.  (45) Date of Patent: Mar. 29, 2011

(54) AUTOMATIC LIGHTING SYSTEM WITH ADAPTIVE ALIGNMENT FUNCTION

(75) Inventors: Michael J. Higgins-Luthman, Livonia, MI (US); Yuesheng Lu, Farmington Hill, MI (US); William C. Ince, Novi, MI (US)

(73) Assignee: Magna Electronics Inc., Holly, MI (US)

( * ) Notice: Subject to any disclaimer, the term of this patent is extended or adjusted under 35 U.S.C. 154(b) by 229 days.

(21) Appl. No.: 12/171,436

(22) Filed: Jul. 11, 2008

(65) Prior Publication Data
US 2009/0016073 A1 Jan. 15, 2009

Related U.S. Application Data

(60) Provisional application No. 60/949,352, filed on Jul. 12, 2007.

(51) Int. Cl.
*F21V 21/28* (2006.01)
*G06K 9/00* (2006.01)
(52) U.S. Cl. .................. 362/465; 362/466; 382/104
(58) Field of Classification Search .............. 362/464, 362/465, 466; 382/100, 103, 104, 117
See application file for complete search history.

(56) References Cited

U.S. PATENT DOCUMENTS

| | | | |
|---|---|---|---|
| 5,457,493 A | 10/1995 | Leddy et al. | |
| 5,550,677 A | 8/1996 | Schofield et al. | |
| 5,670,935 A | 9/1997 | Schofield et al. | |
| 5,796,094 A | 8/1998 | Schofield et al. | |
| 5,877,897 A | 3/1999 | Schofield et al. | |
| 6,313,454 B1 | 11/2001 | Bos et al. | |
| 6,320,176 B1 | 11/2001 | Schofield et al. | |
| 6,353,392 B1 | 3/2002 | Schofield et al. | |
| 6,396,397 B1 | 5/2002 | Bos et al. | |
| 6,477,464 B2 | 11/2002 | McCarthy et al. | |
| 6,497,503 B1 | 12/2002 | Dassanayake et al. | |
| 6,498,620 B2 | 12/2002 | Schofield et al. | |
| 6,678,614 B2 | 1/2004 | McCarthy et al. | |
| 6,690,268 B2 | 2/2004 | Schofield et al. | |
| 6,806,452 B2 | 10/2004 | Bos et al. | |
| 6,824,281 B2 | 11/2004 | Schofield et al. | |
| 6,946,978 B2 | 9/2005 | Schofield | |
| 6,975,775 B2 | 12/2005 | Rykowski et al. | |
| 7,004,593 B2 | 2/2006 | Weller et al. | |
| 7,004,606 B2 | 2/2006 | Schofield | |
| 7,005,974 B2 | 2/2006 | McMahon et al. | |
| 7,038,577 B2 | 5/2006 | Pawlicki et al. | |
| 7,062,300 B1 | 6/2006 | Kim | |
| 7,065,432 B2 * | 6/2006 | Moisel et al. | 701/1 |
| 7,123,168 B2 | 10/2006 | Schofield | |
| 7,167,796 B2 | 1/2007 | Taylor et al. | |
| 7,227,611 B2 * | 6/2007 | Hull et al. | 352/49 |
| 7,526,103 B2 | 4/2009 | Schofield et al. | |
| 7,639,149 B2 * | 12/2009 | Katoh | 340/576 |
| 2004/0114381 A1 | 6/2004 | Salmeen et al. | |

* cited by examiner

*Primary Examiner* — John A Ward
(74) *Attorney, Agent, or Firm* — Van Dyke, Gardner, Linn & Burkhart, LLP

(57) ABSTRACT

An automatic lighting system for a vehicle includes a detection device, an illumination source and a control. The illumination source is directed generally forwardly with respect to a direction of travel of the vehicle, and has an adjustable principal axis of illumination. The detection device may be operable to determine a gaze direction of a driver or driving instructor of a vehicle or may detect a sign or other object of interest, such as a deer or pedestrian or the like, generally forwardly and sidewardly of the vehicle. The control is operable to adjust the principal axis of illumination of the illumination source in response to an output of the detection device so as to provide enhanced illumination at areas sideward and forward of the vehicle.

19 Claims, 3 Drawing Sheets

AUTOMATIC LIGHTING SYSTEM WITH ADAPTIVE ALIGNMENT FUNCTION

CROSS REFERENCE TO RELATED APPLICATION

The present application claims the benefit of U.S. provisional application Ser. No. 60/949,352, filed Jul. 12, 2007, which is hereby incorporated herein by reference in its entirety.

FIELD OF THE INVENTION

The present invention relates generally to vehicle lighting systems and, more particularly, to vehicle lighting systems that may control the headlamps of the vehicle.

BACKGROUND OF THE INVENTION

Vehicle vision systems and/or vehicle headlamp control systems are known and provide enhanced automatic control of the headlamps of a vehicle, typically in response to a detection of a threshold ambient light level and/or a detection of light (such as headlamps of oncoming vehicles and/or taillights of leading vehicles) in the region forward of the vehicle. Examples of such vision and/or headlamp control systems are described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties.

SUMMARY OF THE INVENTION

The present invention provides an automatic vehicle lighting system or light control system with an adaptive alignment function. The light control system of the present invention is operable to control or adjust the beam of a light of the vehicle (or of the headlamps or auxiliary light of the vehicle) in response to a detection of a gaze direction or head angle or pose or position of the head or eyes of the driver of the vehicle, so as to provide enhanced illumination in the direction that the driver is looking, such as toward road signs and/or the like along the road on which the vehicle is traveling.

Optionally, the light control system may be responsive to a detection of a gaze direction of a driving instructor (typically seated in the front passenger seat of the vehicle during a driving instruction or test for the person or student driving the vehicle). In such an application, the light control system provides the driving instructor with a tool to direct the attention of the student in a way that does not force the driver or student to look at the hand-pointing of the instructor, but at the relevant object which is illuminated or highlighted by the automatic adaptively-aligned lighting system.

According to an aspect of the present invention, an automatic lighting system for a vehicle includes a gaze detection device operable to determine a gaze direction of a driver or driving instructor or front seat occupant of a vehicle, an illumination source and a control. The illumination source is directed generally forwardly with respect to a direction of travel of the vehicle, and has an adjustable principal axis of illumination. The control is operable to adjust the principal axis of illumination of the illumination source in response to an output of the gaze detection device. The control adjusts the principal axis of illumination of the illumination source to direct illumination toward an area where the driver or driving instructor or front seat occupant of the vehicle is looking.

Optionally, the gaze detection device may comprise an imaging device for capturing images, with the imaging device having a field of view directed generally toward the head of a driver or driving instructor of the vehicle. An image processing device may process image data to determine the gaze direction of the driver or driving instructor of the vehicle. Optionally, the automatic lighting system may be selectively enabled and disabled in response to a human-machine interface or other systems or inputs. For example, such other systems may include an intelligent headlight system that detects other vehicles so that the host vehicle's light does not shine at the eyes of the driver of an oncoming or leading vehicle, a Global Positioning System (GPS), a roadside information system, the internet, an intelligent transportation system or information system, a communication system, a telematics system, a navigation system or the like, that may provide or generate an output, whereby the automatic illumination system may control the adjusting or enabling of the adaptive alignment light in response to such an output. For example, some geographical locations or jurisdictions may forbid or limit such adaptively aligned lighted systems, whereby it is envisioned that the automatic lighting system may override the adaptive alignment control or otherwise not adjust or limit the adjustment of the adaptive light when the vehicle is in such locations or jurisdictions (such as in response to an output of a global positioning system that is indicative of the vehicle being located at or in such a location or jurisdiction).

According to another aspect of the present invention, an automatic lighting system for a vehicle includes an imaging device for capturing images, a control and an illumination source directed generally forwardly with respect to the direction of travel of the vehicle. The imaging device has a field of view directed generally forwardly with respect to a direction of travel of the vehicle. The control is operable to process image data to determine if a sign, or other important object or object of interest (such as an object of interest to the driver or student or instructor), such as a deer or pedestrian or the like, is present generally forwardly and sidewardly of the vehicle as the vehicle travels along a road. The control is operable to adjust the illumination source in response to a detection of an object of interest (such as a sign or person or animal or other object) generally forwardly and sidewardly of the vehicle, with the control adjusting the illumination source to direct illumination toward an area encompassing the detected object of interest when the object of interest is detected.

These and other objects, advantages, purposes and features of the present invention will become more apparent upon review of the following specification in conjunction with the drawings.

DESCRIPTION OF THE PREFERRED EMBODIMENTS

Figure 1:
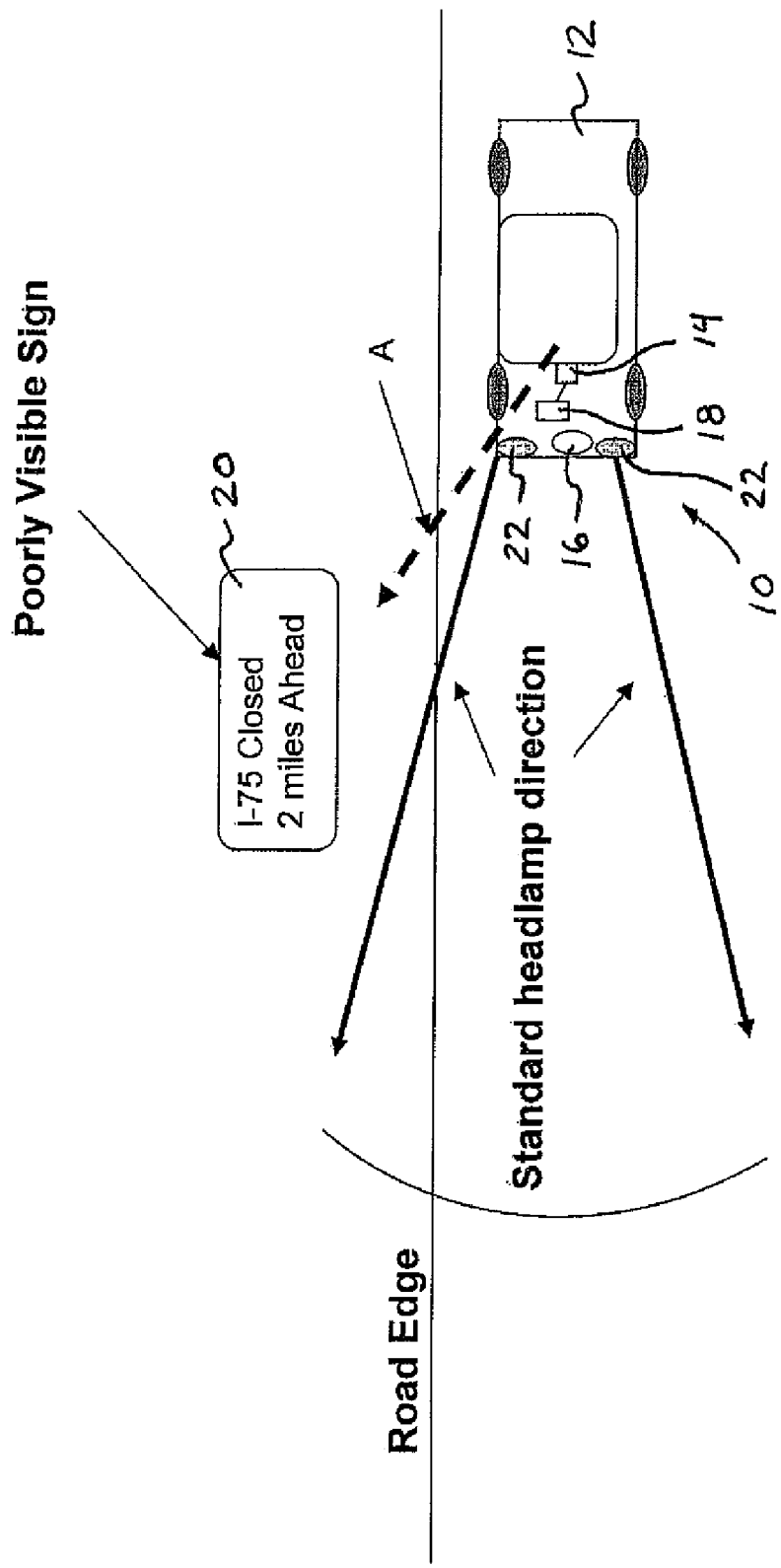
FIG. 1 is a schematic of a vehicle and lighting system, showing that the vehicle headlamps may not substantially illuminate a sign at the side of the road as the vehicle travels along the road and approaches and passes the sign.
Figure 2:
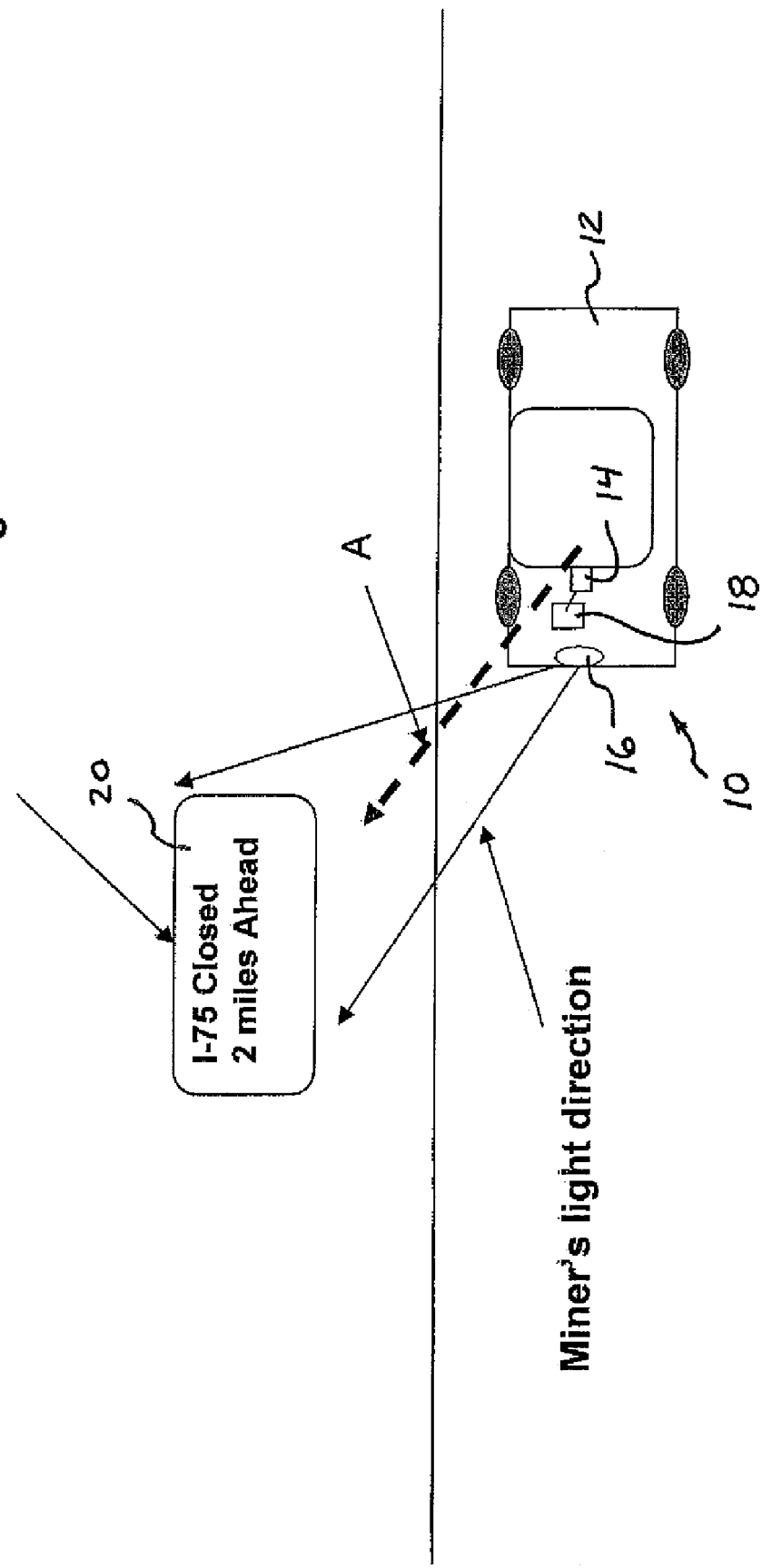
FIG. 2 is a schematic of a vehicle and lighting system in accordance with the present invention, showing an adjustment of illumination from an illumination source to provide enhanced illumination of a sign in response to the driver's or driving instructor's gaze direction or head direction being angled or directed generally toward the sign.

Referring now to the drawings and the illustrative embodiments depicted therein, an automatic lighting system or miner's lighting system 10 of a vehicle 12 includes a gaze detection device 14, such as an imaging device or the like, that is operable to determine a gaze direction or head angle or pose or position of the head or eyes of the driver or driving instructor or occupant of the vehicle, and an illumination source 16 or "miner's light" that is operable or adjustable to provide illumination generally in the direction of the detected gaze or head angle A, so as to provide enhanced illumination of an area that the driver or driving instructor of the vehicle is looking toward (FIGS. 1 and 2). A control or image processor 18 may process the image data to determine the gaze direction or line of sight A and may adjust the angled illumination source accordingly. For example, the illumination source 16 may provide a centrally located illumination source or light or light emitting diode(s) (LED) or the like at a forward portion of the vehicle, and the illumination source may be pivotable or adjustable to adjust its principal axis of illumination toward either side of the vehicle and generally forwardly of the vehicle (and optionally vertically), so as to provide enhanced illumination of a sign or object 20 or the like located forwardly of the vehicle 12 and toward the side of the vehicle as the vehicle travels along a road surface.

The gaze detection device 14 may comprise an imaging sensor or device, such as a pixelated imaging array having a plurality of photosensors arranged in a two dimensional array on a semiconductor substrate, such as a CMOS imaging array or the like. The imaging array may be located within the vehicle, such as in an interior rearview mirror of the vehicle or an accessory module of the vehicle or an overhead console of the vehicle, or steering wheel column of the vehicle or instrument panel of the vehicle or the like, with its field of view directed generally toward a region of the interior cabin of the vehicle that is occupied by or encompasses a head of a typical or average sized driver of the vehicle (at the driver's seat of the vehicle) or driving instructor of the vehicle (typically at the front passenger seat of the vehicle). Optionally, other gaze detecting devices may be implemented while remaining in the spirit and scope of the present invention. The control or image processor processes the image data captured by the imaging device (such as via any suitable processing means, such as via edge detection algorithms or biometric characteristic recognition/identification algorithms or the like) to determine the direction of the driver's or driving instructor's gaze, and adjusts or activates the illumination source in response thereto.

Optionally, the gaze detection device may comprise a cellular telephone with a camera or imaging sensor incorporated therein (or other personal camera device). For example, a camera telephone may be mounted or docked at the vehicle dashboard or interior mirror or elsewhere in the vehicle cabin with the camera directed toward the driver's head (or toward the head of a driving instructor), whereby images captured by the camera may be processed (by circuitry within the telephone or by vehicle-based or mirror-based circuitry or the like within the vehicle) to detect the driver's or driving instructor's gaze direction and activate or control the adjustable light accordingly. Such a system may utilize any suitable telephone or device incorporating a camera or image sensor, and may utilize aspects of the imaging systems described in U.S. provisional application Ser. No. 60/956,633, filed Aug. 17, 2007, which is hereby incorporated herein by reference in its entirety.

In the illustrated embodiment, the illumination source 16 is generally centrally located at a forward portion of the vehicle, and has its principal axis or beam of illumination adjustable toward either side for providing illumination at the targeted area or region at one side of the vehicle, such as at the right side of the vehicle off to the side of the road on which the vehicle is traveling. The illumination source may comprise any suitable illumination source, such as a light emitting diode (LED) or the like, or may comprise one or both of the headlamps of the vehicle. The illumination source may be adjustable, such as pivotable about an axis, or may be adjustable by selectively enabling or activating components, such as light emitting diodes or the like, to direct the illumination in the desired or targeted direction, or a baffle or light guiding element may be adjustably disposed in front of the illumination source and may be adjustable to adjust or guide the principal axis of illumination of the illumination source toward the targeted region at or near the side of the vehicle. Optionally, the adjustable nature of such a light may be accomplished by enabling or disabling or selectively activating/deactivating several individual components, such as individual lighting elements or light sources, such as individual ones of a plurality of or array of light emitting diodes disposed at or near the front of the vehicle, such that such selective activation and deactivation of the light sources results in an adjustment in the principal beam direction of the light sources (for example, the individual light sources may be directed in different directions so that activation of some lights results in a beam of light generally in one direction while activation of other lights results in a beam of light generally in another direction).

Optionally, the illumination source or sources may be vertically adjustable as well as adjustable laterally or side-to-side. Optionally, the range of such adjustment may be limited in the vertical dimension by an intelligent headlight system that is operable to detect the presence or absence of vehicles in the potential location of the adjustable "miner's light". For example, when a vehicle is detected or present in the desired or targeted "miner's light" direction (as determined by the gaze detection system), the light could be further adjusted downward or partially disabled or limited in its upward adjustment so as to prevent glaring light towards the driver or drivers of such other vehicle or vehicles detected ahead of the subject or host vehicle.

Optionally, the range of adjustability of the illumination source may be limited to only the right side of the vehicle (for vehicles that travel on the right side of the road) so as to limit directing the light toward oncoming or approaching traffic forwardly of and to the left of the controlled vehicle. In such applications, the adjustable illumination source may be located at or toward the right side of the vehicle, such as at the front right portion of the vehicle or at the right side portion of the vehicle, so as to be readily directed sidewardly toward the right side of the road while leftward illumination is limited. Optionally, however, the range of adjustability may include movement or directing of light toward the left side of the vehicle, whereby such leftward illumination may be limited to an upwardly directed angle, such as, for example, an angle greater than 10 degrees above horizontal or thereabouts, so as to limit directing the light toward the eyes of the drivers of the oncoming or approaching vehicles. The headlamps of the controlled vehicle remain in their forward angle or orientation to provide the forward illumination of the road in front of the vehicle and are not affected by the adjustment of the illumination source. Optionally, however, the adjustable illumination source may be incorporated into the headlamp 22 (either as a separate illumination source at the headlamps or as an adjustable headlamp), while remaining within the spirit and scope of the present invention.

In situations or road conditions where the driver's or driving instructor's gaze moves back and forth repeatedly, the tracking of eye or head gaze direction could cause excessive swinging or moving of the light that may become annoying to the driver (or others in the vehicle or outside of the vehicle) and/or that may cause fatigue of the driver or driving instructor. Thus, it may be beneficial in such situations for the driver or driving instructor to be able to selectively deactuate or disable or limit the tracking and adjustment function of the present invention. Thus, it is envisioned that the miner's light or adjustable lighting function or system may be selectively or episodically activated so that the illumination source is adjusted in certain situations and not in others, such as in response to a user input or a control input or image input or the like. For example, a user input or control button may be provided at the steering wheel of the vehicle (or elsewhere in the vehicle, such as at the instrument panel or console or overhead console or mirror assembly or the like, where it may be readily accessible by the driver or driving instructor of the vehicle), whereby the user or driver or driving instructor may selectively actuate or enable and deactuate or disable the illumination source or system and/or the adjustment function of the illumination source or system. Optionally, the enabling or disabling of the light alignment system of the present invention could be partial, with limits determined by the same systems also used for total enabling and total disabling of the system. Optionally, the system may be operable to adjust the miner's light only when the gaze direction is generally maintained for a threshold period of time (such as around one second or thereabouts) and the system may not adjust the miner's light when the detected gaze direction is rapidly moving and/or not directed toward an object of interest or the like.

Optionally, the user input to enable/disable the illumination system may comprise other types of human-machine interface, such as, for example, a manual input or voice recognition system or the like. Optionally, the enablement/disablement function of the illumination system may be in response to a camera or imaging device that detects driver or driving instructor movements that are indicative of a situation where the illumination system should be disabled, such as a detection of repeated blinking by the driver or driving instructor or predetermined head movements by the driver or driving instructor or hand movements by the driver or driving instructor or the like. Other user inputs or human-machine interfaces may be implemented to enable/disable/limit the adjustable illumination system while remaining within the spirit and scope of the present invention. For example, intelligent headlight systems that detect vehicles in front of the host vehicle, Global Positioning Systems, roadside information systems or other information systems, the internet, intelligent transportation systems, communication systems or telematics systems or navigation systems (such as a communication system or telematics system that receives a signal or information data from a remote source, such as a telematics system or navigation system utilizing aspects of the systems described in U.S. Pat. Nos. 7,004,593; 6,678,614; 6,477,464; 6,690,268; and/or 7,167,796, which are hereby incorporated herein by reference in their entireties) or the like may also function to disable, enable, or partially enable or limit the operation of the adjustable illumination system.

Figure 3:
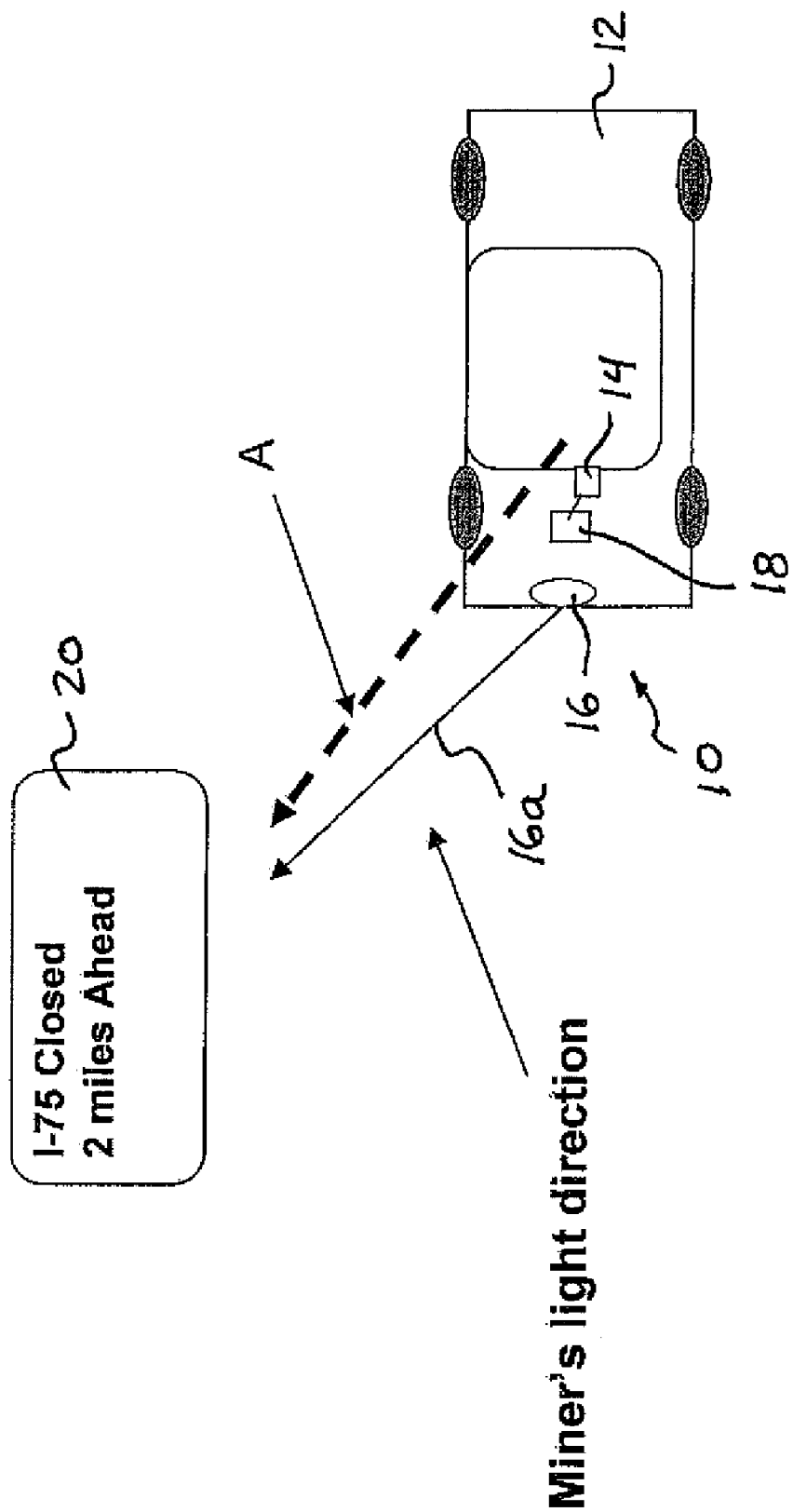
FIG. 3 is another schematic of another vehicle and lighting system in accordance with the present invention, showing that the principal axis of illumination from the illumination source may be adjusted to account for the offset of the illumination source from the driver or driving instructor.

Optionally, because the illumination source and the driver's or driving instructor's eyes or head may be separated by a substantial distance, such as about two meters or thereabouts, it is envisioned that the adjusted angle of the principal axis of illumination 16a may be different than the angle of the gaze direction A, in order to account for the parallax of the sign or object of interest with respect to the driver or driving instructor and the illumination source. As shown in FIG. 3, the control may determine the gaze direction and adjust the direction of the illumination source to account for such parallax, so that the illumination source provides enhanced illumination of the sign or object or area at which the driver's or driving instructor's gaze is directed. The system may detect a sign or object at or near the side of the road in the direction of the driver's gaze and may adjust the principal axis of illumination responsive to the gaze direction and a distance to the detected sign or object along the axis of the gaze direction.

Optionally, the automatic lighting system of the present invention may be used in conjunction with an object recognition system (such as a system operable to detect and/or recognize a sign, animal, such as a large animal such as a deer or the like, pedestrian, or other object) or the like of the vehicle (such as, for example, a sign recognition system utilizing aspects of the systems described in U.S. Pat. Nos. 6,396,397; 6,946,978 and/or 7,004,606, and/or U.S. patent application Ser. No. 11/105,757, filed Apr. 14, 2005, which are hereby incorporated herein by reference in their entireties). For example, the lighting system may include an imaging device (such as a pixelated imaging array or the like or such as a cellular phone with a camera that is mounted or docked in the vehicle or any suitable imaging device or camera or the like) that has a field of view directed generally forwardly with respect to the direction of travel of the vehicle, and that captures images of the scene generally forwardly and/or toward a side of the vehicle, so as to capture images of signs, or other important objects or objects of interest, along the road on which the vehicle is traveling. The control may process the image data to determine if a sign or other object of interest is present forwardly and/or sidewardly of the vehicle, and the illumination source (or principal beam of illumination) may be automatically actuated or adjusted to at least briefly provide illumination of the sign or object of interest. The illumination source thus may automatically illuminate signs or other objects of interest at the side of the road, such as to provide automatic illumination for the driver's or driving instructor's enhanced viewing, or to provide enhanced illumination for an object recognition system of the vehicle (such as a system operable to detect and/or recognize or identify a sign, animal or deer or pedestrian or the like) or the like. The adjustment of the illumination source in response to image processing of image data captured by a forward facing camera may function in conjunction with or independently of the miner's light function described above.

For applications with an object recognition system, the imaging device may automatically capture at least one image of the object when the object is illuminated by the illumination source, whereby the control may process the image data of the illuminated object to determine or recognize characters on the sign, or important or identifiable characteristics of the detected object. For example, an object recognition system may function to determine the nature or classification of a detected object by determining a size of the detected object of interest, a shape of the detected object of interest, a distance to the detected object of interest, and/or a direction toward the detected object of interest and/or the like. Optionally, the control may direct or adjust and flash the illumination source in response to detection of the object (and with the principal axis of the beam of illumination being directed generally toward the detected sign or object), whereby the imaging device may be synchronized with the flashing illumination source to capture one or more images of the object during the brief period of time that the sign or object area is illuminated. Optionally, the illumination source may comprise an infrared or near infrared illumination source and the imaging device may be sensitive to infrared or near infrared illumination, such that the illumination source may provide illumination of the sign or area in a manner that provides enhanced sensing by the imaging device without distracting the driver of the vehicle. Optionally, the object recognition system may output to the driver with a human machine interface modality, such as a visual display, warning light, audio device, or haptic system or the like, information about the detected and recognized object. Such output or outputs may be enhanced beyond the output capabilities available in situations where the object is not additionally illuminated by the adaptively-aligned illumination system.

Therefore, the present invention provides an automatic lighting system that provides enhanced illumination of a sign or important object or object of interest (such as deer or pedestrians) area at a side of a road or toward a side of a vehicle traveling along the road to enhance the viewing by the driver and/or imaging device of signs and the like as the vehicle travels along the road during night time or low lighting driving conditions. The system may monitor the driver's or driving instructor's eyes or head position or orientation to determine a gaze direction and may adjust or activate an illumination source accordingly. The illumination system may be installed in the vehicle during manufacture of the vehicle or may be an aftermarket system. Optionally, the illumination source may provide low intensity light in the general off-road direction, while the headlamps provide higher intensity light in the forward direction of travel of the vehicle. Optionally, the illumination source may provide a localized beam of light that is directed toward a particular sign or point of interest or object of interest at or near the side of the road. Optionally, the lighting system of the present invention may be responsive to an input from a steering wheel angle sensor, so that the illumination source may be activated or adjusted to illuminate a side region of the road in response to a detection of a turning of the steering wheel of the vehicle. Optionally, the lighting system of the present invention may provide a wider or taller beam pattern for enhanced illumination of the targeted area or object, depending on or responsive to one or more of the inputs discussed above.

The present invention thus provides for enhanced lighting of signs and the like at the side of the road and provides enhanced lighting of other regions that are typically outside a typical headlight range and orientation of the headlights of the vehicle. The imaging device and control and image processor and illumination source may comprise any suitable components, and may utilize aspects of the vision systems of the text described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and 6,824,281, which are all hereby incorporated herein by reference in their entireties. The imaging device and/or control may be part of or share components or circuitry with other image or imaging or vision systems of the vehicle, such as headlamp control systems and/or rain sensing systems and/or cabin monitoring systems and/or the like.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. An automatic lighting system for a vehicle, said automatic lighting system comprising:
    a gaze detection device operable to determine a gaze direction of a driver or driving instructor of a vehicle;
    an illumination source directed generally forwardly with respect to a direction of travel of the vehicle, said illumination source having an adjustable principal axis of illumination; and
    a control operable to adjust said principal axis of illumination of said illumination source in response to an output of said gaze detection device, said control adjusting said principal axis of illumination of said illumination source to direct illumination toward an area where the driver or driving instructor of the vehicle is looking.

2. The automatic lighting system of claim 1, wherein said area is generally forwardly and sidewardly of the vehicle.

3. The automatic lighting system of claim 1, wherein said gaze detection device comprises an imaging device for capturing images, said imaging device having a field of view directed generally toward the head of a driver or driving instructor of the vehicle, wherein an image processing device processes image data to determine the gaze direction of the driver or driving instructor of the vehicle.

4. The automatic lighting system of claim 1, wherein said illumination source is generally centrally located at a forward portion of the vehicle.

5. The automatic lighting system of claim 1, wherein said automatic lighting system is selectively enabled, disabled or partially enabled in response to an output of at least one of (a) a human-machine interface, (b) an intelligent headlight system which detects vehicles in front of the host vehicle, (c) a Global Positioning System, (d) a roadside information system, (e) the internet, (f) an intelligent transportation system, (g) a communication system, (h) a telematics system, and (i) a navigation system.

6. The automatic lighting system of claim 1, wherein said control is operable to adjust said principal axis of illumination of said illumination source in a horizontal direction and a vertical direction.

7. An automatic lighting system for a vehicle, said automatic lighting system comprising:
    an imaging device for capturing images, said imaging device having a field of view directed generally forwardly with respect to a direction of travel of the vehicle;
    a control operable to process image data to determine if an object of interest is present generally forwardly and sidewardly of the vehicle as the vehicle travels along a road;
    an illumination source directed generally forwardly with respect to the direction of travel of the vehicle; and
    wherein said control is operable to adjust said illumination source in response to a detection of an object of interest generally forwardly and sidewardly of the vehicle, said control adjusting said illumination source to direct illumination toward an area encompassing the detected object of interest when the object of interest is detected.

8. The automatic lighting system of claim 7, wherein said imaging device captures at least one image of the object of interest when the object of interest is illuminated by said illumination source, and wherein said control processes image data to determine or recognize characteristics of the detected object of interest.

9. The automatic lighting system of claim 8, wherein the detected object of interest comprises a sign and wherein said control processes image data to determine or recognize characters on the sign.

10. The automatic lighting system of claim 8, wherein said control processes image data to determine or recognize relevant aspects of the detected object of interest including at least one of (a) a size of the detected object of interest, (b) a shape of the detected object of interest, (c) a distance to the detected object of interest, and (d) a direction toward the detected object of interest.

11. The automatic lighting system of claim 7, wherein said illumination source has an adjustable principal axis of illumination, and wherein said control is operable to adjust said principal axis of illumination of said illumination source in response to the detection of the object of interest, said control adjusting said principal axis of illumination of said illumination source to direct illumination toward an area encompassing the detected object of interest.

12. The automatic lighting system of claim 11, wherein said control is operable to adjust said principal axis of illumination of said illumination source in a horizontal direction and a vertical direction.

13. The automatic lighting system of claim 7, wherein said control flashes said illumination source in response to detection of the object of interest.

14. The automatic lighting system of claim 7, wherein said automatic lighting system is selectively enabled and disabled in response to an output of at least one of (a) a human-machine interface, (b) an intelligent headlight system which detects vehicles in front of the host vehicle, (c) a Global Positioning System, (d) a roadside information system, (e) the internet, (f) an intelligent transportation system, (g) a communication system, (h) a telematics system, and (i) a navigation system.

15. An automatic lighting system for a vehicle, said automatic lighting system comprising:

a gaze detection device operable to determine a gaze direction of a driver or driving instructor of a vehicle, wherein said gaze detection device comprises an imaging device for capturing images, said imaging device having a field of view directed generally toward the head of a driver or driving instructor of the vehicle, wherein an image processing device processes image data to determine the gaze direction of the driver or driving instructor of the vehicle;

an illumination source directed generally forwardly with respect to a direction of travel of the vehicle, said illumination source having an adjustable principal axis of illumination; and a control operable to adjust said principal axis of illumination of said illumination source in response to an output of said gaze detection device, said control adjusting said principal axis of illumination of said illumination source to direct illumination toward an area where the driver or driving instructor of the vehicle is looking, wherein said area is generally forwardly and sidewardly of the vehicle.

16. The automatic lighting system of claim 15, wherein said automatic lighting system is selectively enabled, disabled or partially enabled in response to an output of at least one of (a) a human-machine interface, (b) an intelligent headlight system which detects vehicles in front of the host vehicle, (c) a Global Positioning System, (d) a roadside information system, (e) the internet, (f) an intelligent transportation system, (g) a communication system, (h) a telematics system, and (i) a navigation system.

17. The automatic lighting system of claim 15, wherein said control is operable to adjust said principal axis of illumination of said illumination source in a horizontal direction and a vertical direction.

18. The automatic lighting system of claim 15 further comprising a second imaging device for capturing images, said second imaging device having a field of view directed generally forwardly with respect to a direction of travel of the vehicle, wherein said control is operable to process image data to determine if an object of interest is present generally forwardly and sidewardly of the vehicle as the vehicle travels along a road, and wherein said control is operable to adjust said illumination source in response to a detection of an object of interest within said field of view of said second imaging device, said control adjusting said illumination source to direct illumination toward an area encompassing the detected object of interest when the object of interest is detected.

19. The automatic lighting system of claim 18, wherein said imaging device captures at least one image of the object of interest when the object of interest is illuminated by said illumination source, and wherein said control processes image data to determine or recognize characteristics of the detected object of interest.

* * * * *